United States Patent
Sudo (10) Patent No.: US 7,729,390 B2
(45) Date of Patent: Jun. 1, 2010

(54) CODE DIVISION MULTIPLE ACCESS TRANSMITTING APPARATUS HAVING PLURAL SPREADING SECTIONS THAT PERFORM SPREADING PROCESSING SEPARATELY FOR A RETRANSMISSION SIGNAL USING DIFFERENT SPREADING CODES

(75) Inventor: Hiroaki Sudo, Yokohama (JP)

(73) Assignee: Panasonic Corporation, Osaka (JP)

( * ) Notice: Subject to any disclaimer, the term of this patent is extended or adjusted under 35 U.S.C. 154(b) by 795 days.

(21) Appl. No.: 10/500,721

(22) PCT Filed: Aug. 11, 2003

(86) PCT No.: PCT/JP03/10201

§ 371 (c)(1),
(2), (4) Date: Jul. 6, 2004

(87) PCT Pub. No.: WO2004/019533

PCT Pub. Date: Mar. 4, 2004

(65) Prior Publication Data

US 2005/0089085 A1    Apr. 28, 2005

(30) Foreign Application Priority Data

Aug. 23, 2002  (JP) ............................ 2002-244309

(51) Int. Cl.
H04J 3/02 (2006.01)
G08C 25/02 (2006.01)

(52) U.S. Cl. ..................................... 370/537; 714/748

(58) Field of Classification Search ................. 370/342, 370/337, 349, 335; 714/748, 749

See application file for complete search history.

(56) References Cited

U.S. PATENT DOCUMENTS

| 5,504,775 | A |   | 4/1996 | Chouly et al. |
| 5,781,542 | A | * | 7/1998 | Tanaka et al. ............... 370/342 |
| 5,881,099 | A | * | 3/1999 | Takahashi et al. ........... 375/141 |

(Continued)

FOREIGN PATENT DOCUMENTS

EP    1 003 296    5/2000

(Continued)

OTHER PUBLICATIONS

International Search Report dated Oct. 28, 2003.

(Continued)

*Primary Examiner*—George Eng
*Assistant Examiner*—Christopher M Brandt
(74) *Attorney, Agent, or Firm*—Dickinson Wright PLLC (57) ABSTRACT

A transmit signal is spread by a plurality of spreading sections 103, 104, 105, and 106, using different spreading codes. A selection section 107 increases the number of spread signals to be output as the number of retransmissions increases. By this means, a retransmission signal spread by means of many spreading codes is code division multiplexed. As a result, retransmission signal error rate characteristics are improved on the receiving side by despreading this code division multiplexed signal using the same plurality of spreading codes as on the transmitting side, and selecting or combining the despreading results with the greatest correlation power thereamong. Also, since the degree of code multiplexing is increased proportionally as the number of retransmissions increases, retransmission signal error rate characteristics can be improved without lowering spectral efficiency unnecessarily.

3 Claims, 6 Drawing Sheets

U.S. PATENT DOCUMENTS

| | | | | |
|---|---|---|---|---|
| 5,966,377 | A * | 10/1999 | Murai | 370/342 |
| 6,233,251 | B1 * | 5/2001 | Kurobe et al. | 370/471 |
| 6,266,360 | B1 * | 7/2001 | Okamoto | 375/140 |
| 6,549,527 | B1 * | 4/2003 | Tsutsui et al. | 370/342 |
| 6,574,018 | B1 * | 6/2003 | Handelman | 398/49 |
| 6,594,287 | B1 * | 7/2003 | Seytter | 370/539 |
| RE38,472 | E * | 3/2004 | Wada et al. | 370/524 |
| 7,564,827 | B2 * | 7/2009 | Das et al. | 370/342 |
| 2001/0014091 | A1 * | 8/2001 | Yamada et al. | 370/349 |
| 2001/0040913 | A1 * | 11/2001 | Arai et al. | 375/144 |
| 2002/0060997 | A1 * | 5/2002 | Hwang | 370/335 |
| 2002/0181421 | A1 * | 12/2002 | Sano et al. | 370/335 |
| 2003/0012126 | A1 | 1/2003 | Sudo | |
| 2003/0112744 | A1 * | 6/2003 | Baum et al. | 370/206 |
| 2004/0042386 | A1 * | 3/2004 | Uesugi et al. | 370/204 |
| 2006/0171416 | A1 * | 8/2006 | Seidel et al. | 370/473 |

FOREIGN PATENT DOCUMENTS

| | | |
|---|---|---|
| EP | 1 248 401 | 10/2002 |
| JP | 06318926 | 11/1994 |
| JP | 09321665 | 12/1997 |
| JP | 10-233758 | 9/1998 |
| JP | 2000151504 | 5/2000 |
| JP | 2002-124895 | 4/2002 |
| JP | 2002164864 | 6/2002 |
| JP | 2003218830 | 7/2003 |

OTHER PUBLICATIONS

Japanese Office Action dated Jan. 15, 2008 with English Translation thereof.

Supplementary European Search Report dated Apr. 9, 2009.

F. Fitzek, et al., "Quality of Service Support for Real-Time Multimedia Applications Over Wireless Links Using the Simultaneous MAC-Packet Transmission (SMPT) in a CDMA Environment," 5$^{th}$ International Workshop on Mobile Multimedia Communications, Berlin, Oct. 12, 1998, pp. 1-11.

* cited by examiner

CODE DIVISION MULTIPLE ACCESS TRANSMITTING APPARATUS HAVING PLURAL SPREADING SECTIONS THAT PERFORM SPREADING PROCESSING SEPARATELY FOR A RETRANSMISSION SIGNAL USING DIFFERENT SPREADING CODES

TECHNICAL FIELD

The present invention relates to a radio transmitting apparatus that uses the CDMA method and a radio transmitting apparatus that uses the OFDM-CDMA method, and the method thereof.

BACKGROUND ART

Conventionally, in radio communication using the CDMA method, a transmit signal is spread and transmitted, and on the receiving side a received signal is despread using the same spreading code as on the transmitting side. By this means, in CDMA radio communication, signals directed to a plurality of users can be code division multiplexed and transmitted by preparing a plurality of mutually orthogonal spreading codes.

Also, in CDMA communication, when a transmission error is detected on the receiving side, the transmitting side is requested to retransmit the same signal, and thus the error rate characteristics of receive data are improved.

Figure 1:
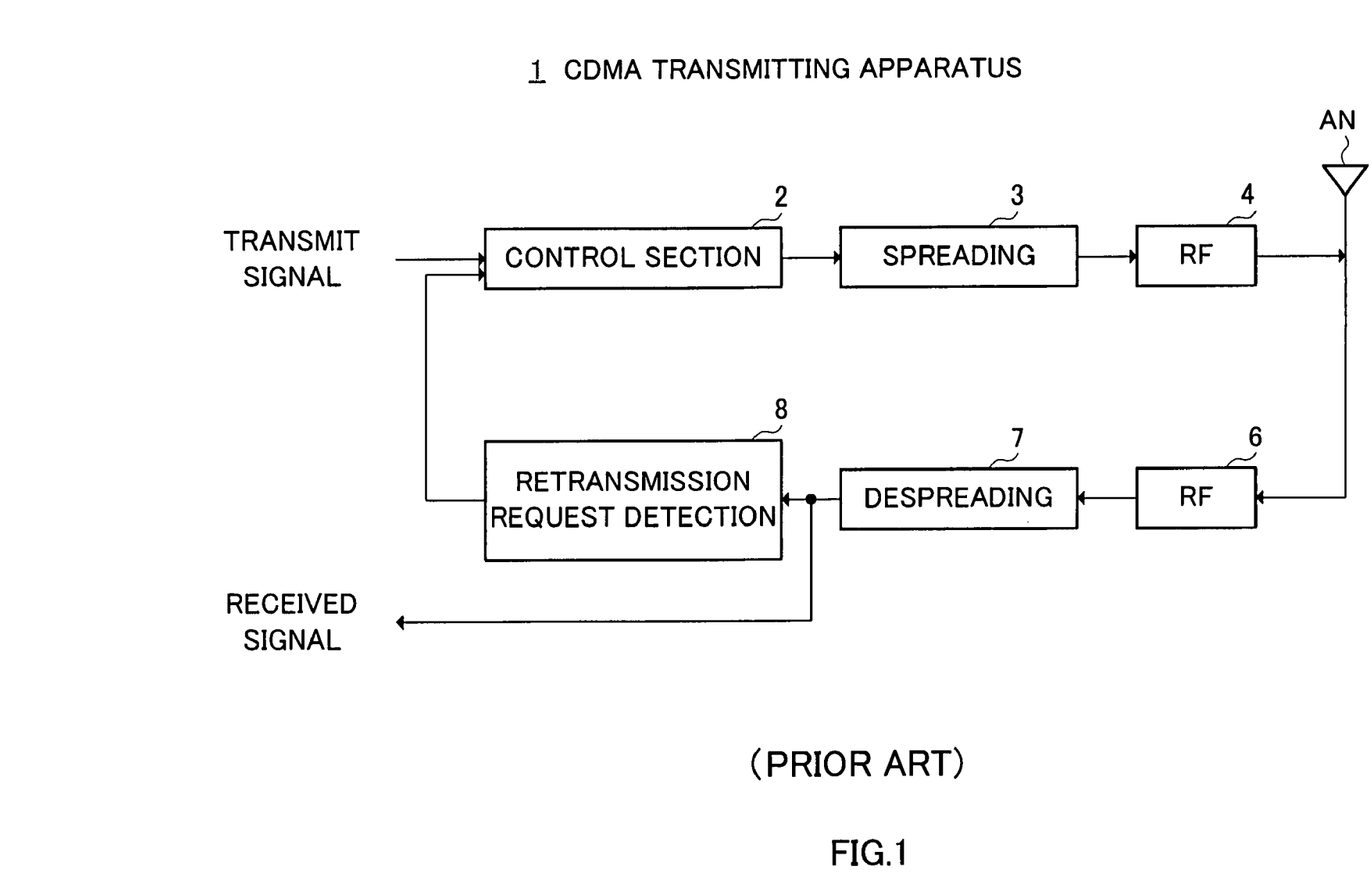
FIG. 1 is a block diagram showing the configuration of a conventional CDMA transmitting apparatus.

FIG. 1 shows the configuration of a conventional CDMA transmitting apparatus. CDMA transmitting apparatus 1 sends a modulated transmit signal to a spreading section 3 via a control section 2. The spread signal obtained by means of spreading section 3 is transmitted via a radio transmitting section (RF) 4 that performs radio transmission processing such as digital-analog conversion processing and signal amplification, and an antenna AN.

CDMA transmitting apparatus 1 also inputs a CDMA signal received by antenna AN to a despreading section 7 via a radio receiving section (RF) 6 that performs radio reception processing such as analog-digital conversion processing. The signal despread by despreading section 7 is output as a received signal, and is also sent to a retransmission request detection section 8. Retransmission request detection section 8 detects a retransmission request signal included in the received signal, and sends the detection result to control section 2.

Control section 2 is provided with a buffer, and if there is a retransmission request, the previously transmitted transmit signal stored in the buffer is output as a retransmission signal. Control section 2 also performs control of retransmission signal transmission timing and so forth.

However, with a conventional CDMA radio transmitting apparatus, particularly when channel fluctuations are slow, errors may occur consecutively even when a signal directed to a specific user is retransmitted. In this case, the problem of an excessive increase of the number of retransmissions arises. Since transmission delay increases as the number of retransmissions increases, the major problem of decreased transmission efficiency occurs. There is thus a method whereby retransmissions are discontinued when a given time is reached, but in this case a new problem arises of degradation of error rate characteristics.

DISCLOSURE OF INVENTION

It is an object of the present invention to provide a CDMA or OFDM-CDMA radio transmitting apparatus, and a method thereof, that enable the number of retransmissions to be effectively reduced with almost no degradation of the error rate.

This object is achieved by increasing the number of spreading codes assigned to a retransmission signal as the number of retransmissions increases. That is to say, a retransmission signal is transmitted by code division multiplexing using a plurality of spreading codes in accordance with the number of retransmissions.

By this means, retransmission signal error rate characteristics can be improved on the receiving side by despreading a code division multiplexed retransmission signal to which a plurality of spreading codes are assigned, using the same plurality of spreading codes as on the transmitting side, and selecting or combining the despreading results with the greatest correlation power thereamong. As a result, the number of retransmissions can be prevented from increasing excessively with almost no degradation of transmission efficiency.

BEST MODE FOR CARRYING OUT THE INVENTION

With reference now to the accompanying drawings, embodiments of the present invention will be explained in detail below.

Embodiment 1

Figure 2:
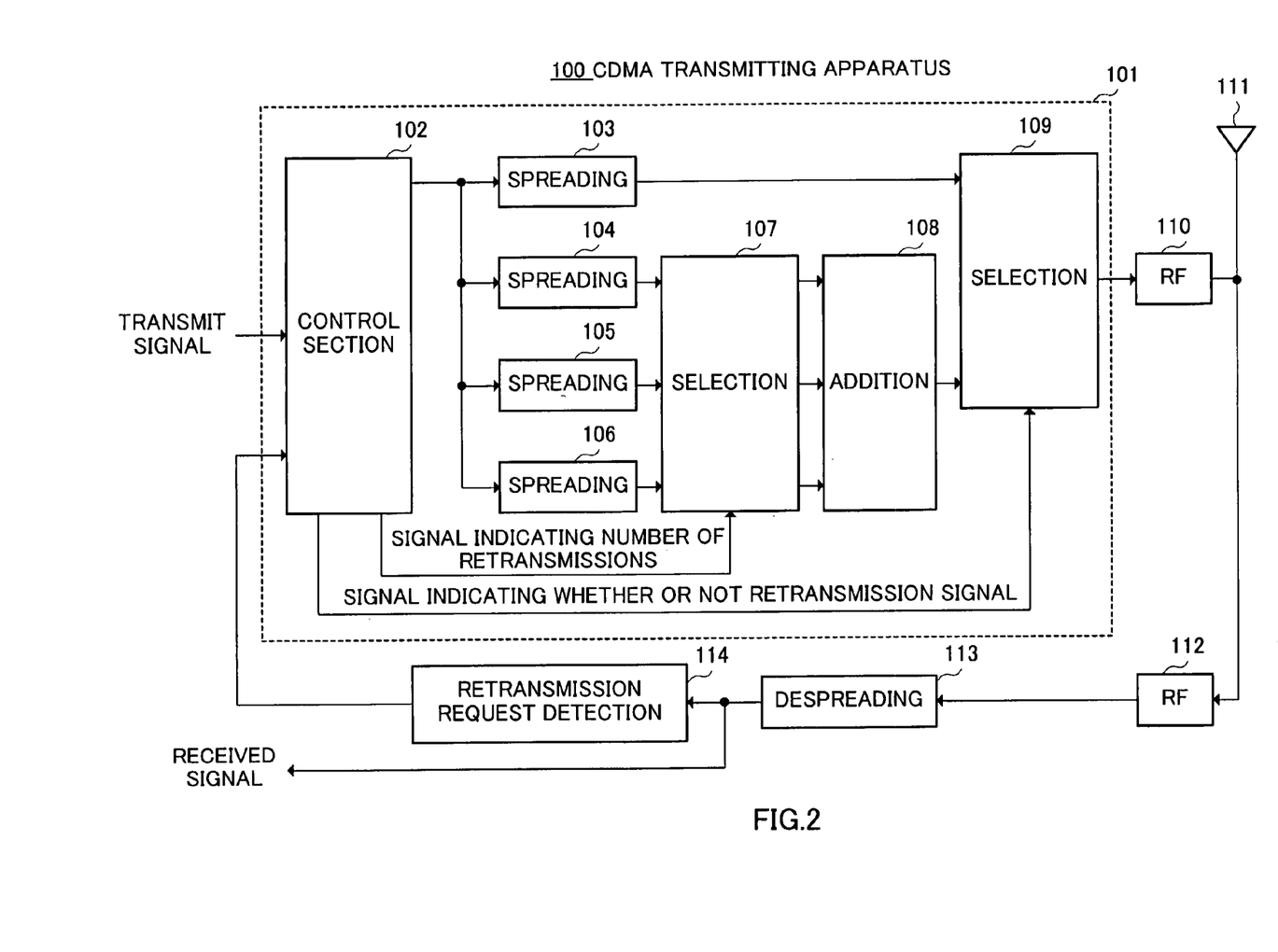
FIG. 2 is a block diagram showing the configuration of a CDMA transmitting apparatus according to Embodiment 1 of the present invention.

FIG. 2 shows the outline configuration of a radio transmitting apparatus according to Embodiment 1 of the present invention. In CDMA transmitting apparatus 100, a modulated transmit signal is input to a control section 102 of a code division multiplexing unit 101. At predetermined timing, control section 102 sends an input transmit signal to a plurality of spreading sections 103 through 106 that perform spreading processing using different spreading codes. Here, spreading sections 103 through 106 perform spreading processing using mutually orthogonal spreading codes (that is to say, spreading codes with a mutual correlation of 0).

A spread signal obtained by means of spreading section 103 is sent to a selection section 109, and spread signals obtained by means of spreading sections 104, 105, and 106 are sent to a selection section 107. Selection section 107 outputs spread signals selectively based on a signal from control section 102 indicating the number of retransmissions. Specifically, at the time of the first retransmission, only the despread signal from spreading section 104 is selected and output, at the time of the second retransmission, despread signals from spreading section 104 and spreading section 105 are selected and output, and at the time of the third retransmission, despread signals from spreading sections 104, 105, and 106 are selected and output.

An addition section 108 adds spread signals output from selection section 107. By this means a code division multiplexed signal is obtained. Selection section 109 selectively outputs only the signal from spreading section 103 or signals from both spreading section 103 and addition section 108, based on a signal from control section 102 indicating whether or not the signal to be transmitted this time is a retransmission signal. Specifically, in the case of a first transmission, only the signal from spreading section 103 is selected and output, and in the case of a retransmission, signals from both spreading section 103 and addition section 108 are selected and output.

The output from selection section 109 is transmitted via a radio transmitting section (RF) 110 that performs radio transmission processing such as digital-analog conversion processing and signal amplification, and an antenna 111, provided as transmitting means.

In the receiving system of CDMA transmitting apparatus 100, a CDMA signal received by antenna 111 is input to a despreading section 113 via a radio receiving section (RF) 112 that performs radio reception processing such as analog-digital conversion processing. The signal despread by despreading section 113 is output as a received signal, and is also sent to a retransmission request detection section 114. Retransmission request detection section 114 detects a retransmission request signal included in the received signal, and sends the detection result to control section 102.

Control section 102 is provided with a buffer, and if there is a retransmission request, the previously transmitted transmit signal stored in the buffer is output as a retransmission signal. Control section 102 also performs control of retransmission signal transmission timing and so forth.

Figure 3:
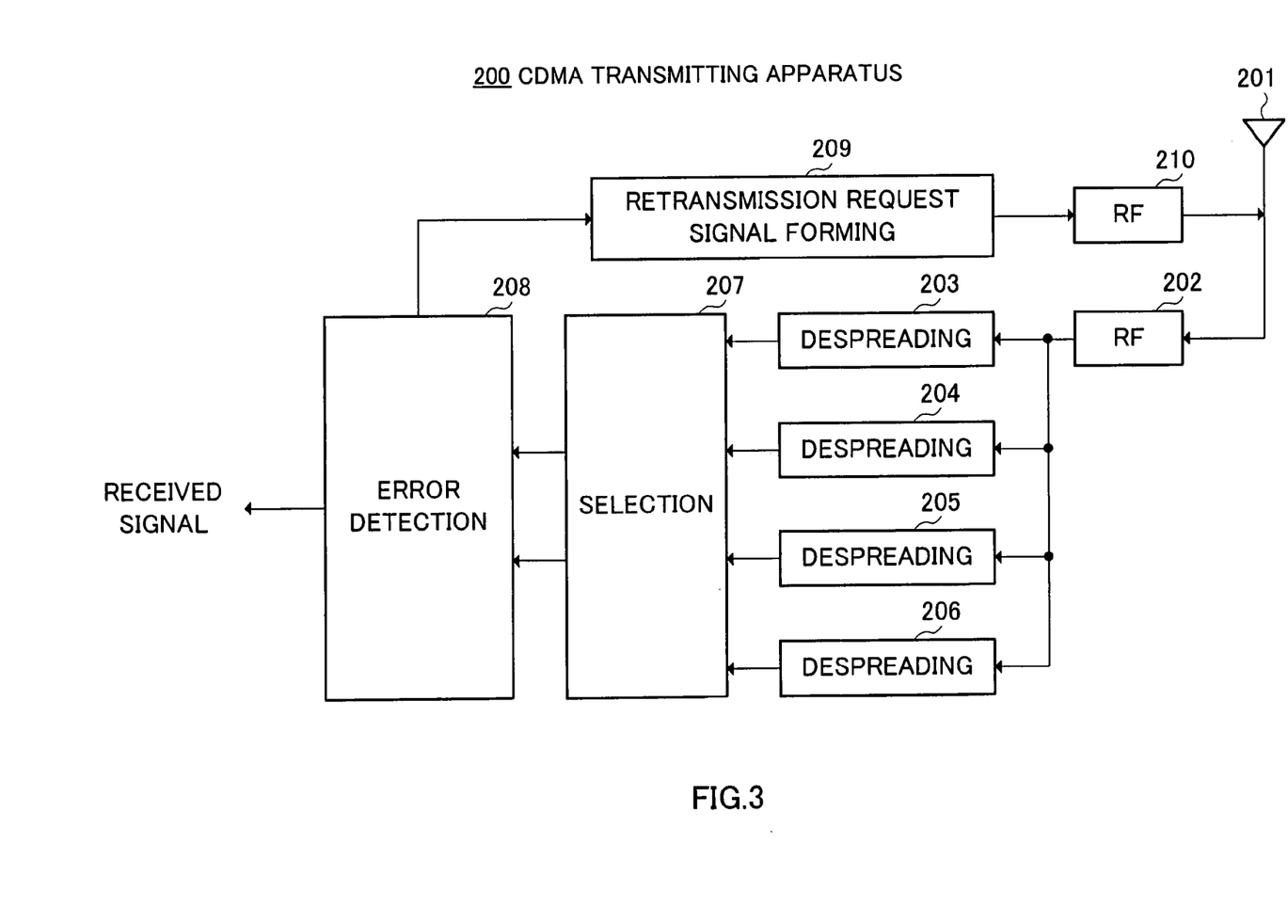
FIG. 3 is a block diagram showing the configuration of a CDMA receiving apparatus of Embodiment 1.

FIG. 3 shows the outline configuration of a radio receiving apparatus that receives a CDMA signal transmitted from CDMA transmitting apparatus 100. In CDMA receiving apparatus 200, a CDMA signal received by an antenna 201 is input to a plurality of despreading sections 203 through 206 via a radio receiving section (RF) 202 that performs radio reception processing such as analog-digital conversion processing. Here, despreading sections 203, 204, 205, and 206 despread the received CDMA signal using the same spreading codes as used by spreading sections 103, 104, 105, and 106, respectively, of CDMA transmitting apparatus 100.

The despreading results obtained by means of despreading sections 203 through 206 are input to a selection section 207. Selection section 207 selects the despreading results with the greatest correlation power from among the despreading results, and sends the selected spreading results to an error detection section 208.

Error detection section 208 detects whether or not an error has occurred in the despreading results, and if an error is not detected, outputs the input signal as a received signal. On the other hand, if an error is detected, the fact is reported to are transmission request signal forming section 209. To simplify the explanation, it is here assumed that an error is detected directly from despreading results, but in actuality, an error is detected after despreading results are demodulated and decoded. Retransmission request signal forming section 209 forms a retransmission request signal when an error is detected. The retransmission request signal is transmitted to CDMA transmitting apparatus 100 via a radio transmitting section (RF) 210 and antenna 201.

With the above configuration, at the time of a first transmission, in CDMA transmitting apparatus 100 a transmit signal spread by spreading section 103 is selected by selection section 109 and transmitted. When CDMA receiving apparatus 200 receives this first-time transmit signal, the result of despreading by despreading section 203 is output to error detection section 208, and if an error is detected by error detection section 208, a retransmission request signal is transmitted to CDMA transmitting apparatus 100.

At the time of a first retransmission, in CDMA transmitting apparatus 100 only the spread signal from spreading section 104 is selected by selection section 107, and the spread signal from spreading section 103 and the output from addition section 108 are further selected by selection section 109. As a result, a 2-code-multiplexed retransmission signal is transmitted from CDMA transmitting apparatus 100. When CDMA receiving apparatus 200 receives this first retransmission signal, selection section 207 selects the despread signal with the greater correlation power from the despreading results from despreading section 203 and despreading section 204, and sends the selected despread signal to error detection section 208. If an error is detected by error detection section 208, a retransmission request signal is again transmitted to CDMA transmitting apparatus 100.

At the time of a second retransmission, in CDMA transmitting apparatus 100 spread signals from spreading section 104 and spreading section 105 are selected by selection section 107, and the spread signal from spreading section 103 and the output from addition section 108 are further selected by selection section 109. As a result, a 3-code-multiplexed retransmission signal is transmitted from CDMA transmitting apparatus 100. When CDMA receiving apparatus 200 receives this second retransmission signal, selection section 207 selects the despread signal with the greatest correlation power from among the despreading results from despreading sections 203, 204, and 205, and sends the selected despread signal to error detection section 208. If an error is detected by error detection section 208, a retransmission request signal is again transmitted to CDMA transmitting apparatus 100.

At the time of a third retransmission, in CDMA transmitting apparatus 100 spread signals from spreading sections 104, 105, and 106 are selected by selection section 107, and the spread signal from spreading section 103 and the output from addition section 108 are further selected by selection section 109. As a result, a 4-code-multiplexed retransmission signal is transmitted from CDMA transmitting apparatus 100. When CDMA receiving apparatus 200 receives this third retransmission signal, selection section 207 selects the despread signal with the greatest correlation power from among the despreading results from despreading sections 203, 204, 205, and 206.

By thus increasing the number of spreading codes assigned to a retransmission signal as the number of retransmissions increases, the error rate improvement effect can be increased as the number of retransmissions increases. As a result, the number of retransmissions can effectively be reduced without degrading error rate characteristics.

Naturally, when a plurality of spreading codes are assigned to one retransmission signal (that is, when multicode multiplexing is performed), the degree of code multiplexing decreases (that is, the number of other signals that can be transmitted decreases proportionally), and therefore spectral efficiency falls. However, by increasing the number of spreading codes assigned to a transmit signal for which retransmission is performed as the number of retransmissions increases, it is possible to suppress a fall in spectral efficiency when retransmission is performed even more than when the number of spreading codes assigned is increased.

According to the above configuration, by increasing the number of spreading codes assigned to a retransmission signal as the number of retransmissions increases, it is possible to implement a CDMA transmitting apparatus 100 that enables the number of retransmissions to be effectively reduced with almost no degradation of error rate characteristics.

In the above embodiment, a case has been described in which the correlation power of a plurality of despreading results is detected by selection section 207, and the despreading result with the greatest correlation power is selected as a received signal, but the present invention is not limited to this, and a received signal may also be obtained by combining a plurality of despreading results.

Also, in the above embodiment, a case has been described in which 2-code-multiplexing is used at the time of a first retransmission, 3-code-multiplexing is used at the time of a second retransmission, and 4-code-multiplexing is used at the time of a third retransmission, but the present invention is not limited to this, and it is essential only that the degree of code multiplexing be increased in accordance with an increase in the number of retransmissions.

Moreover, in the above embodiment, a case has been described in which a number of spread signals corresponding to the number of retransmissions are selected by selection section 107 from among a plurality of spread signals obtained by means of a plurality of spreading sections 103 through 106, but it is essential only that the degree of code multiplexing of a transmit signal be increased as the number of retransmissions increases, and it is also possible, for example, to increase the number of spreading sections that are operated in accordance with the number of retransmissions, and multiplex the outputs thereof.

Furthermore, in the above embodiment, transmission to one communicating party (user) has been described in order to simplify the explanation, but it is of course also possible to execute similar processing for signals directed to a plurality of users, and transmit these signals by code division multiplexing. In this case, for example, a number of code division multiplexing units 101 in FIG. 2 equivalent to the number of users may be provided, and signals output from each selection section 109 may be multiplexed and transmitted.

Embodiment 2

In this embodiment, it is proposed that the number of spreading codes assigned to a retransmission signal be increased as the number of retransmissions increases in a communication method (generally referred to as the OFDM-CDMA communication method) that combines the CDMA communication method and OFDM (orthogonal frequency division multiplexing) communication method.

The OFDM-CDMA communication method here enables interference of preceding and succeeding codes in a multipath environment to be eliminated by means of a guard interval, so that when the transmitting method of the present invention—that is, increasing the number of spreading codes assigned to a retransmission signal as the number of retransmissions increases—is applied, it is possible to substantially improve error rate characteristics in a multipath environment, and to increase the effect of suppressing the number of retransmissions.

Figure 4:
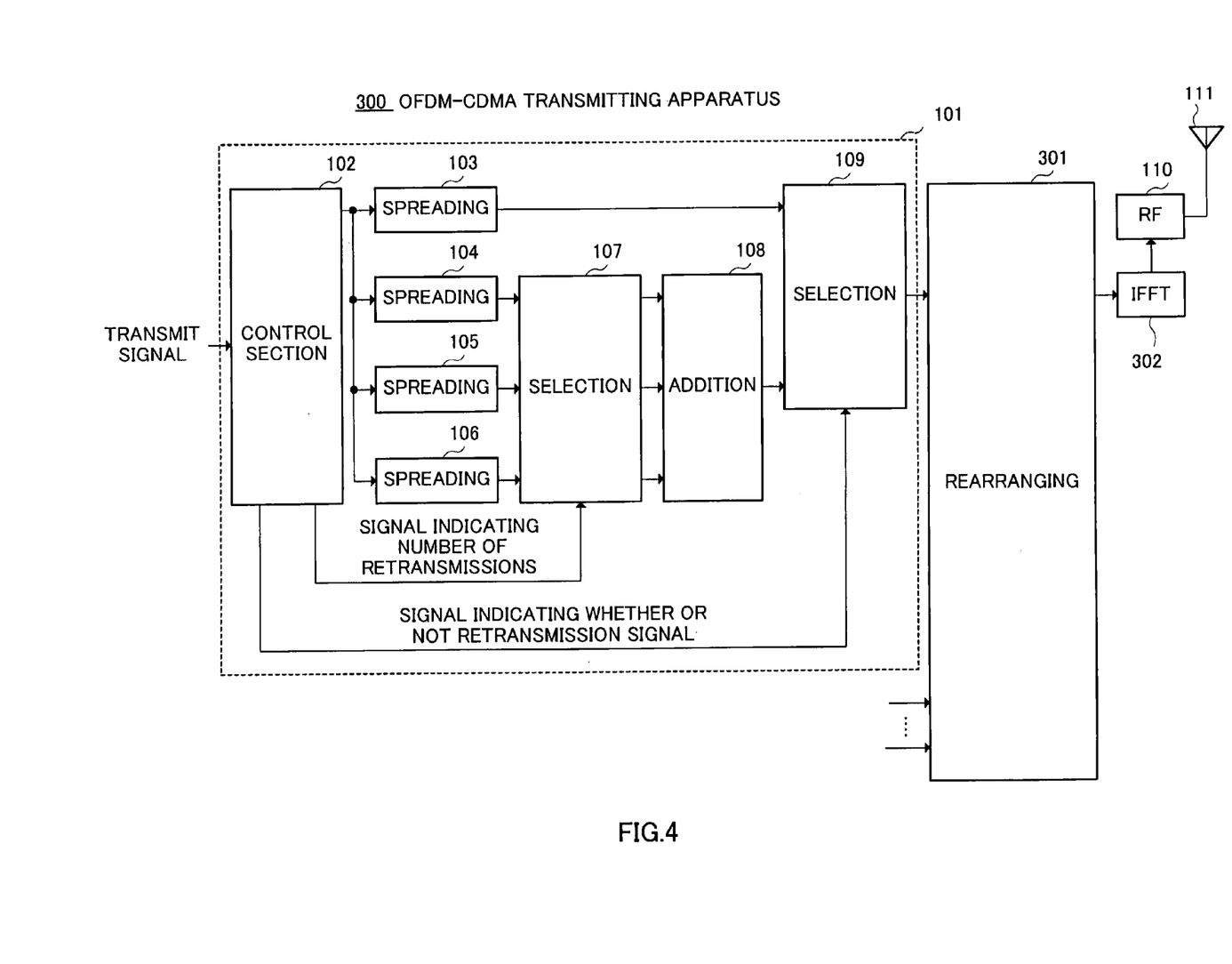
FIG. 4 is a block diagram showing the configuration of an OFDM-CDMA transmitting apparatus of Embodiment 2.

In FIG. 4, in which parts corresponding to those in FIG. 2 are assigned the same codes as in FIG. 2, an OFDM-CDMA transmitting apparatus 300 of this embodiment has a similar configuration to CDMA transmitting apparatus 100 in FIG. 2, except for having a rearranging section 301 that comprises a parallel/serial conversion circuit and serial/parallel conversion circuit and rearranges a spread signal, and an inverse fast Fourier transform section (IFFT) 302 that places spread chips on a mutually orthogonal plurality of subcarriers by executing inverse fast Fourier transform processing on a rearranged spread signal.

Spread transmit signals directed to a plurality of users are input to this rearranging section 301. Then OFDM-CDMA transmitting apparatus 300 can spread post-spreading chips in the frequency axis direction, in the time axis direction, or in both the frequency axis and time axis directions, according to processing by rearranging section 301. The receiving system, not shown in FIG. 4, has a configuration that receives a retransmission request signal from a communicating party in the same way as in FIG. 2.

According to the above configuration, by increasing the number of spreading codes assigned to a retransmission signal as the number of retransmissions increases in an OFDM-CDMA transmitting apparatus 300 that performs OFDM-CDMA communication, it is possible to implement an OFDM-CDMA transmitting apparatus 300 that enables error rate characteristics in a multipath environment to be substantially improved, and the number of retransmissions to be substantially reduced.

Embodiment 3

In this embodiment, it is proposed that the number of spreading codes assigned to a retransmission signal be varied according to the overall transmit signal degree of code multiplexing. That is to say, considering the fact that, ultimately, the degree of code multiplexing for transmission by code division multiplexing is not limited to a signal directed to one user but also includes signals directed to other users, the number of spreading codes assigned to a retransmission signal is varied according to the degree of code multiplexing of all of these. By this means, it is possible to substantially improve retransmission signal error rate characteristics compared with Embodiment 1, and so to substantially reduce the number of retransmissions.

Figure 5:
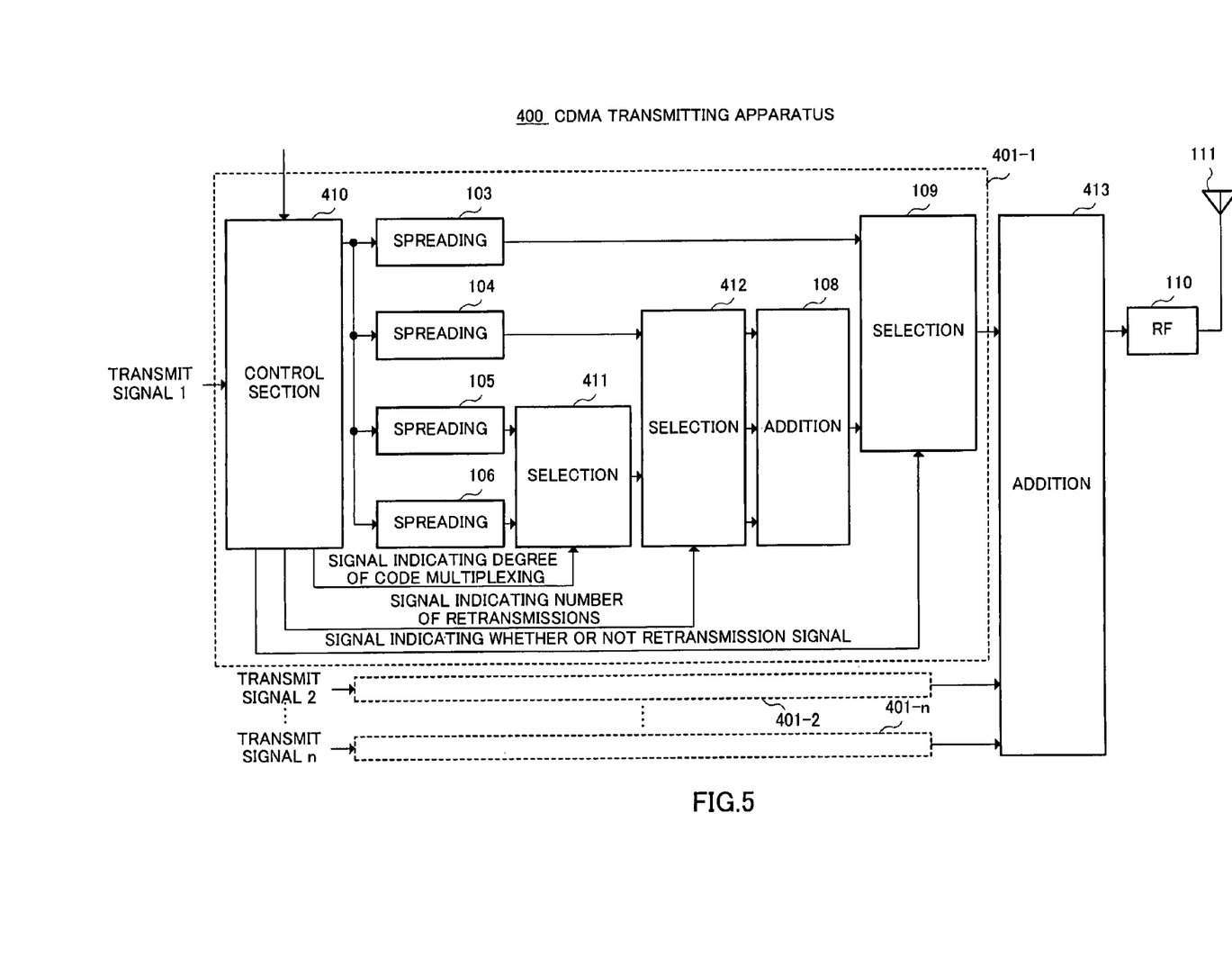
FIG. 5 is a block diagram showing the configuration of a CDMA transmitting apparatus of Embodiment 3.

In FIG. 5, in which parts corresponding to those in FIG. 2 are assigned the same codes as in FIG. 2, a CDMA transmitting apparatus 400 of this embodiment has a number of code division multiplexing units 401-1 through 401-$n$ equivalent to the number of users (n). As code division multiplexing units 401-2 through 401-$n$ have a similar configuration to code division multiplexing unit 401-1, the configuration of code division multiplexing unit 401-1 will be described below.

When the degree of code multiplexing is greater than or equal to a predetermined number according to the overall degree of code multiplexing for transmission from CDMA transmitting apparatus 400—that is, the degree of code multiplexing equivalent to the codes added by an addition section 413—selection section 411 of code division multiplexing unit 401-1 outputs only one or other of the two input spread signals. On the other hand, when the degree of code multiplexing is less than the predetermined number, selection section 411 outputs both input spread signals. The same kind of processing is also performed for the other code division multiplexing units 401-2 through 401-$n$. Then the outputs of selection sections 109 provided in each of code division multiplexing units 401-1 through 401-$n$ are multiplexed by addition section 413.

Control section 410 of code division multiplexing unit 401-1 receives as input from a higher-level control section (not shown) of CDMA transmitting apparatus 400 a signal indicating the overall degree of code multiplexing of CDMA transmitting apparatus 400, and sends this signal to selection section 411. The configuration of the receiving system that detects a retransmission request signal, omitted from FIG. 5 in order to simplify the diagram, is similar to that in FIG. 2.

With the above configuration, at the time of a first transmission, in CDMA transmitting apparatus 400 a transmit signal spread by spreading section 103 is selected by selection section 109 and transmitted. Also, at the time of a first retransmission, only the spread signal from spreading section 104 is selected by selection section 412, and the spread signal from spreading section 103 and the output from addition section 108 are further selected by selection section 109. As a result, a 2-code-multiplexed retransmission signal is output from selection section 109.

At the time of a second retransmission, in CDMA transmitting apparatus 400 spread signals from spreading section 104 and selection section 411 are selected by selection section 412, and these spread signals are multiplexed by addition section 108. If the degree of code multiplexing of CDMA transmitting apparatus 400 overall is great, one spread signal is output by selection section 411, and if the degree of code multiplexing is small, two spread signals are output, as a result of which two or three spread signals are multiplexed by addition section 412. As a result, a 3-code- or 4-code-multiplexed retransmission signal is output from selection section 109.

At the time of a third retransmission, in CDMA transmitting apparatus 400 spread signals from spreading section 104 and selection section 411 are selected by selection section 412, and these spread signals are multiplexed by addition section 108. If the degree of code multiplexing of CDMA transmitting apparatus 400 overall is great, one spread signal is output by selection section 411, and if the degree of code multiplexing is small, two spread signals are output, as a result of which two or three spread signals are multiplexed by addition section 412. As a result, a 3-code- or 4-code-multiplexed retransmission signal is output from selection section 109.

By thus having CDMA transmitting apparatus 400 not simply increase the number of spreading codes assigned to a retransmission signal as the number of retransmissions increases, but also consider the overall degree of code multiplexing including spread signals directed to other users code division multiplexed together with that retransmission signal, in deciding the number of spreading codes to be assigned to a retransmission signal, it is possible to substantially improve retransmission signal error rate characteristics, and substantially reduce the number of retransmissions.

Certainly, considering that the number of spreading codes assigned to one retransmission signal is increased, a plurality of spread signals are formed for one retransmission signal and these are multiplexed and transmitted, and signals with the largest correlation power are selected or combined on the receiving side, it can be expected that error rate characteristics will improve proportionally as more spreading codes are assigned to a retransmission signal.

However, when the degree of code multiplexing is great, associated inter-code interference also increases, and therefore error rate characteristics may actually degrade. In the case of multipath propagation, in particular, orthogonality between spreading codes is lost, and therefore error rate characteristics degrade if the degree of code multiplexing is too great.

In this embodiment, by deciding the number of spreading codes to be assigned to a retransmission signal in a range within which the overall transmit signal degree of code multiplexing does not exceed a predetermined value, inter-code interference can be suppressed, error rate characteristics can be substantially improved, and the number of retransmissions can be substantially reduced.

According to the above configuration, by varying the number of spreading codes assigned to a retransmission signal according to the degree of code multiplexing, it is possible to implement a CDMA transmitting apparatus 400 that enables retransmission signal error rate characteristics to be substantially improved compared with Embodiment 1, thereby enabling the number of retransmissions to be substantially reduced.

In this embodiment, a case has been described in which 2-code-multiplexing is used at the time of a first retransmission, 3-code-multiplexing is used at the time of a second retransmission, and 4-code-multiplexing is used at the time of a third retransmission, but these are only examples, and the degrees of code multiplexing are not limited to these.

Also, in this embodiment, a case has been described in which the present invention is applied to a CDMA transmitting apparatus 400 using the CDMA communication method, but the present invention may also be applied to a radio transmitting apparatus using the OFDM-CDMA communication method. In this case, a rearranging section comprising a parallel/serial conversion section and serial/parallel conversion section may be provided instead of addition section 413, and inverse Fourier transform processing may be performed on a rearranged signal.

Embodiment 4

In this embodiment, it is proposed that, in addition to providing the configuration of Embodiment 1 or Embodiment 3, the transmission power of a retransmission signal be increased as the number of retransmissions increases. By this means, it is possible to substantially improve retransmission signal error rate characteristics compared with Embodiment 1 or Embodiment 3, and so substantially reduce the number of retransmissions.

Figure 6:
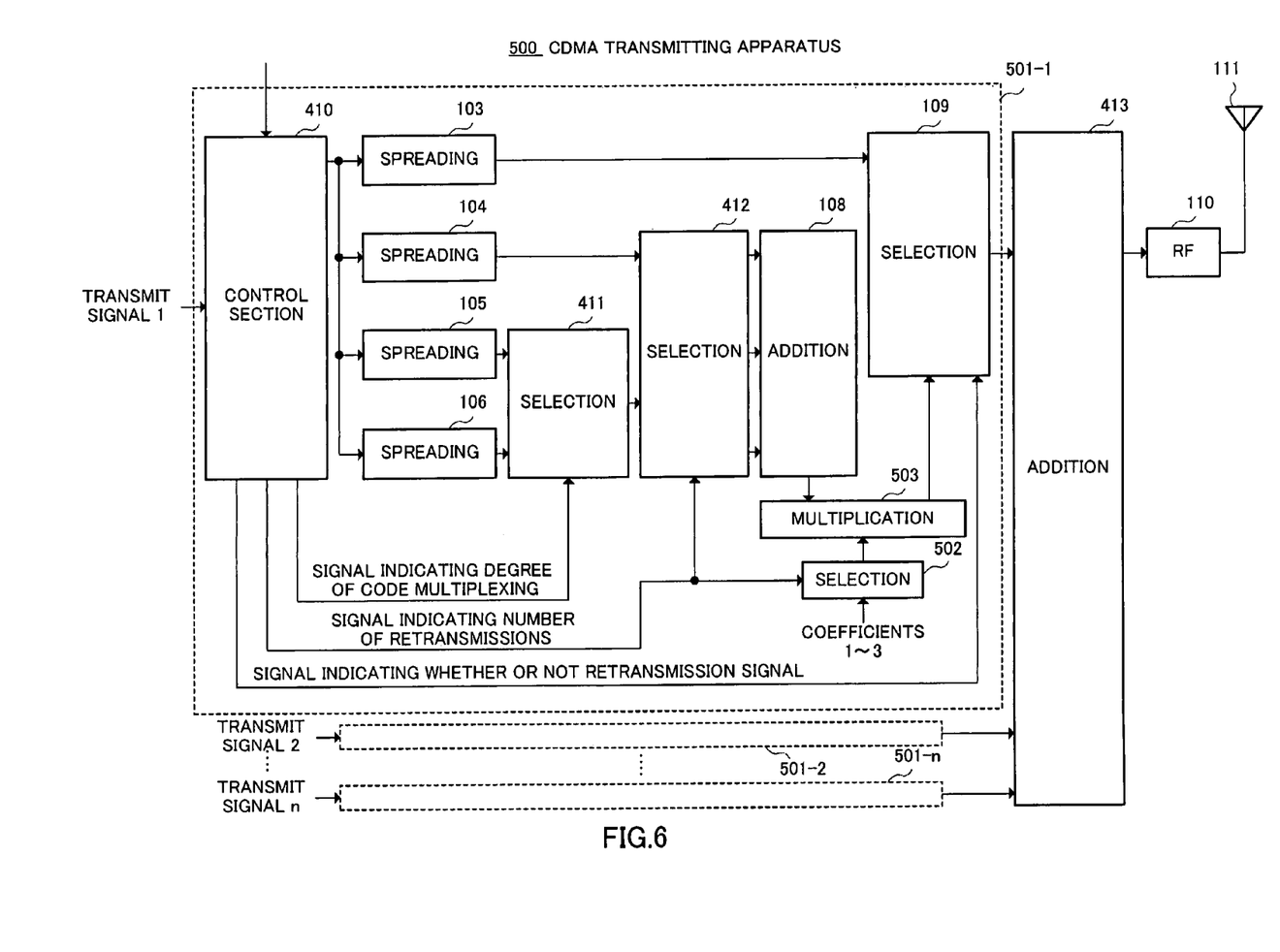
FIG. 6 is a block diagram showing the configuration of a CDMA transmitting apparatus of Embodiment 4.

In FIG. 6, in which parts corresponding to those in FIG. 5 are assigned the same codes as in FIG. 5, code division multiplexing unit 501-1 of CDMA transmitting apparatus 500 of this embodiment has a similar configuration to that of CDMA transmitting apparatus 400 in FIG. 5, except for having a multiplication section 503 as a transmission power control section downstream of addition section 108, and a selection section 502 for selecting a multiplication coefficient for multiplication by multiplication section 503.

Selection section 502 selects a coefficient in accordance with a signal from control section 410 indicating the number of retransmissions. Specifically, selection section 502 selects "1" as a coefficient at the time of a first retransmission, selects "2" as a coefficient at the time of a second retransmission, and selects "3" as a coefficient at the time of a third retransmission. As a result, at the time of a first retransmission the signal from addition section 108 is output at its original signal level from multiplication section 503, at the time of a second retransmission the signal from addition section 108 is output with its signal level doubled from multiplication section 503, and at the time of a third retransmission the signal from addition section 108 is output with its signal level tripled from multiplication section 503.

Thus, in CDMA transmitting apparatus 500, as the number of retransmissions increases, the number of spreading codes assigned to a retransmission signal is increased and retransmission signal transmission power is also increased. Specifically, at the time of initial transmission, transmission is performed at the same transmission power as signals directed to other users; at the time of a first retransmission, transmission is performed at twice the transmission power of signals directed to other users; at the time of a second retransmission, transmission is performed at three times the transmission power of signals directed to other users; and at the time of a third retransmission, transmission is performed at four times the transmission power of signals directed to other users.

According to the above configuration, by increasing the transmission power of a retransmission signal as the number of retransmissions increases in addition to increasing the number of spreading codes assigned to a retransmission signal as the number of retransmissions increases, it is possible to implement a CDMA transmitting apparatus 500 that enables retransmission signal error rate characteristics to be substantially improved, and thus enables the number of retransmissions to be substantially reduced.

The transmission power set values described in this embodiment are only examples, and the present invention is not limited to these, it being essential only that the transmission power of a retransmission signal be increased as the number of retransmissions increases.

Furthermore, a method is also effective whereby the transmission power of a retransmission signal is varied according to the overall degree of code multiplexing in transmission from a CDMA transmitting apparatus. Specifically, since the degree of code multiplexing is naturally small when the number of users is small, in this case, quality can be improved for users for whom retransmission is performed by further increasing the transmission power of a retransmission signal.

Also, in above Embodiments 1, 3, and 4, a CDMA transmitting apparatus has been described, but similar effects to those in Embodiments 1, 3, and 4 can also be obtained when the configurations of Embodiments 1, 3, and 4 are applied to an OFDM-CDMA transmitting apparatus.

In addition, in OFDM-CDMA radio transmission, a spread signal is distributed among a plurality of subcarriers, allowing a greater degree of freedom in spread signal arrangement than in the case of CDMA. For example, it is possible to set time-domain spreading whereby a spread signal is arranged in the time direction of the same subcarrier, frequency-domain spreading whereby a spread signal is arranged on different subcarriers (that is, is arranged in the frequency direction), or two-dimensional spreading whereby a spread signal is arranged in both the time direction and the frequency direction.

Thus, when the present invention is applied to OFDM-CDMA, and the number of spreading codes assigned to a retransmission signal is increased as the number of retransmissions increases, a spread signal can be transmitted arranged with a degree of freedom on a plurality of subcarriers, enabling transmission to be performed with a spread signal accommodated efficiently in a plurality of subcarriers even when the number of chips increases, for instance.

The present invention is not limited to the above-described embodiments, and various variations and modifications may be possible without departing from the scope of the present invention.

A CDMA transmitting apparatus of the present invention has a configuration comprising a code division multiplexing section that increases the number of spreading codes assigned to a retransmission signal as the number of retransmissions increases and performs multicode multiplexing of a retransmission signal, and a transmitting section that performs radio transmission of a multicode-multiplexed retransmission signal.

A CDMA transmitting apparatus of the present invention has a configuration further comprising an orthogonal frequency division multiplexing section that forms an OFDM-CDMA signal by distributing a multiplexed spread signal among a plurality of subcarriers.

According to these configurations, a retransmission signal is transmitted code division multiplexed (multicode-multiplexed) using a plurality of spreading codes, so that retransmission signal error rate characteristics are improved on the receiving side by despreading this code division multiplexed signal using the same plurality of spreading codes as on the transmitting side, and selecting or combining despreading results with the greatest correlation power thereamong. Also, since the degree of code multiplexing is increased proportionally as the number of retransmissions increases, retransmission signal error rate characteristics can be improved without lowering spectral efficiency unnecessarily. As a result, the number of retransmissions can be effectively reduced with almost no degradation of the error rate.

A CDMA transmitting apparatus or OFDM-CDMA transmitting apparatus of the present invention has a configuration wherein the code division multiplexing section varies the number of spreading codes assigned to the aforementioned retransmission signal in accordance with the number of other code division multiplexed signals multiplexed in a retransmission signal after multicode multiplexing.

According to this configuration, the degree of code multiplexing of all signals transmitted, including code division multiplexed signals directed to other users, is considered in deciding the number of spreading codes to be assigned to a retransmission signal, thereby enabling inter-code interference to be suppressed. As a result, it is possible to substantially improve retransmission signal error rate characteristics, and substantially reduce the number of retransmissions.

A CDMA transmitting apparatus or OFDM-CDMA transmitting apparatus of the present invention has a configuration further comprising a transmission power control section that increases the transmission power of an aforementioned multicode-multiplexed retransmission signal as the number of retransmissions increases.

According to this configuration, retransmission signal error rate characteristics can be improved proportionally as the number of retransmissions increases, enabling the number of retransmissions to be substantially reduced. It is also possible to prevent interference being imposed on other signals unnecessarily to a greater degree than when transmission power is controlled at a high level from the time when the number of retransmissions is small.

A CDMA transmitting apparatus or OFDM-CDMA transmitting apparatus of the present invention has a configuration wherein the transmission power control section varies transmission power in accordance with the number of other code division multiplexed signals multiplexed in an aforementioned retransmission signal after multicode multiplexing.

According to this configuration, if, for example, transmission power is increased when the number of other code division multiplexed signals is small, and not increased when the number of other code division multiplexed signals is large, the effect on other signals can be substantially reduced, and retransmission signal error rate characteristics can be effectively improved.

As described above, according to the present invention, by increasing the number of spreading codes assigned to a retransmission signal as the number of retransmissions increases, it is possible to provide a CDMA or OFDM-CDMA radio transmitting apparatus, and a radio transmitting method, that enable the number of retransmissions to be effectively reduced with almost no degradation of the error rate.

This application is based on Japanese Patent Application No. 2002-244309 filed on Aug. 23, 2002, entire content of which is expressly incorporated by reference herein.

INDUSTRIAL APPLICABILITY

The present invention is applicable to a CDMA or OFDM-CDMA radio communication system for which it is required that the number of retransmissions be effectively reduced without degrading the error rate.

The invention claimed is:

1. A transmitting apparatus comprising:

a spreading section that generates a predetermined number of spread signals, each of the predetermined number of spread signals being generated by performing spreading processing on a retransmission signal using a different spreading code, wherein the predetermined number increases according to how many times the retransmission signal has been failed to be received by a receiving user;

a multiplexing section that generates a multiplexed signal by multiplexing the predetermined number of spread signals and other user signals, said other user signals being signals to be transmitted to users other than the receiving user;

a limiting section that limits the predetermined number not to exceed a maximum number, wherein, the maximum number is determined according to how many other user signals are to be multiplexed together with the predetermined number of spread signals in said multiplexing section; and a transmitting section that transmits the multiplexed signal to the receiving user.

2. The transmitting apparatus according to claim 1, wherein said limiting section determines the maximum number, such that the maximum number decreases as more other user signals are to be multiplexed.

3. The transmitting apparatus according to claim 1, wherein the predetermined number increases each time the retransmission signal fails to be received by the receiving user.

* * * * *